United States Patent [19]

Schroder

[11] Patent Number: 4,864,208
[45] Date of Patent: Sep. 5, 1989

[54] ACTUAL POSITION SIGNAL GENERATOR FOR THE POSITION CONTROL CIRCUIT OF AN ELEVATOR DRIVE

[75] Inventor: Joris Schröder, Lucerne, Switzerland

[73] Assignee: Inventio AG, Switzerland

[21] Appl. No.: 212,895

[22] Filed: Jun. 30, 1988

[30] Foreign Application Priority Data

Jun. 30, 1987 [CH] Switzerland ............... 02459187/87

[51] Int. Cl.⁴ .......................................... G05B 19/29
[52] U.S. Cl. .................................. 318/603; 187/101; 187/134
[58] Field of Search ............... 318/603; 187/101, 134

[56] References Cited

U.S. PATENT DOCUMENTS

| | | | |
|---|---|---|---|
| 4,337,847 | 7/1982 | Schröder et al. | 187/101 |
| 4,389,631 | 6/1983 | Kajiyama | 187/134 |
| 4,427,095 | 1/1984 | Payne et al. | 187/134 |
| 4,627,518 | 12/1986 | Meguerdichian | 187/134 |
| 4,754,851 | 7/1988 | Suzuki | 187/134 |

FOREIGN PATENT DOCUMENTS 2640681 8/1984 European Pat. Off. .

Primary Examiner—William M. Shoop, Jr.
Assistant Examiner—Saul M. Bergmann
Attorney, Agent, or Firm—Marshall & Melhorn

[57] ABSTRACT

An actual position value transmitter for an elevator position control circuit includes a pulse transmitter in the form of a digital tachometer which is driven by way of a cable and a car distance counter responsive to the pulses for generating an actual position signal. Stopping errors of the elevator car caused by slip of the cable are avoided by utilizing a correction table in the form of a write-read memory, in which correction values assigned to the floors and corresponding to the stopping errors are stored. The correction table is connected to the car distance counter and on departure of the elevator car from a floor or on passing a floor, a correction value assigned to the next floor is fetched from the correction table and fed to the car distance counter for the purpose of correction of the actual position signal.

6 Claims, 1 Drawing Sheet

ACTUAL POSITION SIGNAL GENERATOR FOR THE POSITION CONTROL CIRCUIT OF AN ELEVATOR DRIVE

BACKGROUND OF THE INVENTION

The invention relates in general to an elevator control system and, in particular, to an actual position value transmitter for an elevator system.

In a typical elevator position control circuit, a pulse transmitter is coupled with a drive pulley, which can be driven by means of a cable attached to an elevator car and carried in friction contact over a guide roller, and generates a pulsed signal to a car distance counter. An output of the distance counter is connected as a feedback signal with an input of a control device of the position control circuit.

In the European Patent Application No. 0 026 406, a drive control for an elevator is shown which includes a typical actual position value transmitter. Herein the pulse transmitter is coupled with the shaft of the speed-limiting device and is driven by an endless rope guided over a drive pulley attached to the elevator car and which is tightened by a tension roller with a weight in the shaft pit. This drive control is designed in microcomputer technology and exhibits a floor level memory in the form of a write-read memory in which floor level values assigned to the floor numbers are referred to a certain base. The floor levels are required for the shop initiation and the precise entrance of the elevator at a floor.

The writing-in of the floor levels into the floor level memory takes place during an instructional travel prior to the first putting in operation of the elevator. The instructional travel starts at the lowest floor in the upward direction and, at each floor, the instantaneous counter reading of the car distance counter is transferred as the floor level value into the floor level memory.

The rope drive of the speed limiting device exhibits slip, which can be recognized in such a manner, that the counter readings transferred during the upward travel are smaller than the actual level numbers of the respective floors. These discrepancies have no effect in all later upward travel, since the counter read-outs and floor levels agree precisely. During downward travel, slip also appears, which acts in such a way that the counter read-outs of the car distance counter are greater than the actual level numbers of the respective floors. Since in the downward travels the levels which were stored during the upward-instructional travel are used, a stopping inaccuracy can occur at the stop of the elevator car after a downward travel, which inaccuracy corresponds to the sum of the slip of the upward and downward travel.

SUMMARY OF THE INVENTION

In the present invention, a correction table is provided in the form of a write-read memory in which stopping errors caused by the slip of the cable are stored by floor as correction values. At the departure of a car from a floor or on passing a floor, a correction value assigned to the next floor is generated from the correction table and fed to the car distance counter for the purpose of correcting the counter read-out.

The advantages realized with the present invention are that the car distance counter on arrival at a floor will always indicate correctly. This becomes particularly noticeable in the case of elevators with a great height of lift, because the slip, according to experience, increases with the height of lift and in this way large stopping errors could occur.

It is an object of the present invention to provide an actual position value transmitter which corrects for errors due to cable slip thereby improving the stopping accuracy of an elevator car.

BRIEF DESCRIPTION OF THE DRAWINGS

The above, as well as other objects of the invention will become readily apparent to one skilled in the art from reading the following detailed description of the preferred embodiment of the invention when considered in the light of the accompanying drawing in which.

DESCRIPTION OF THE PREFERRED EMBODIMENT

Figure 1:
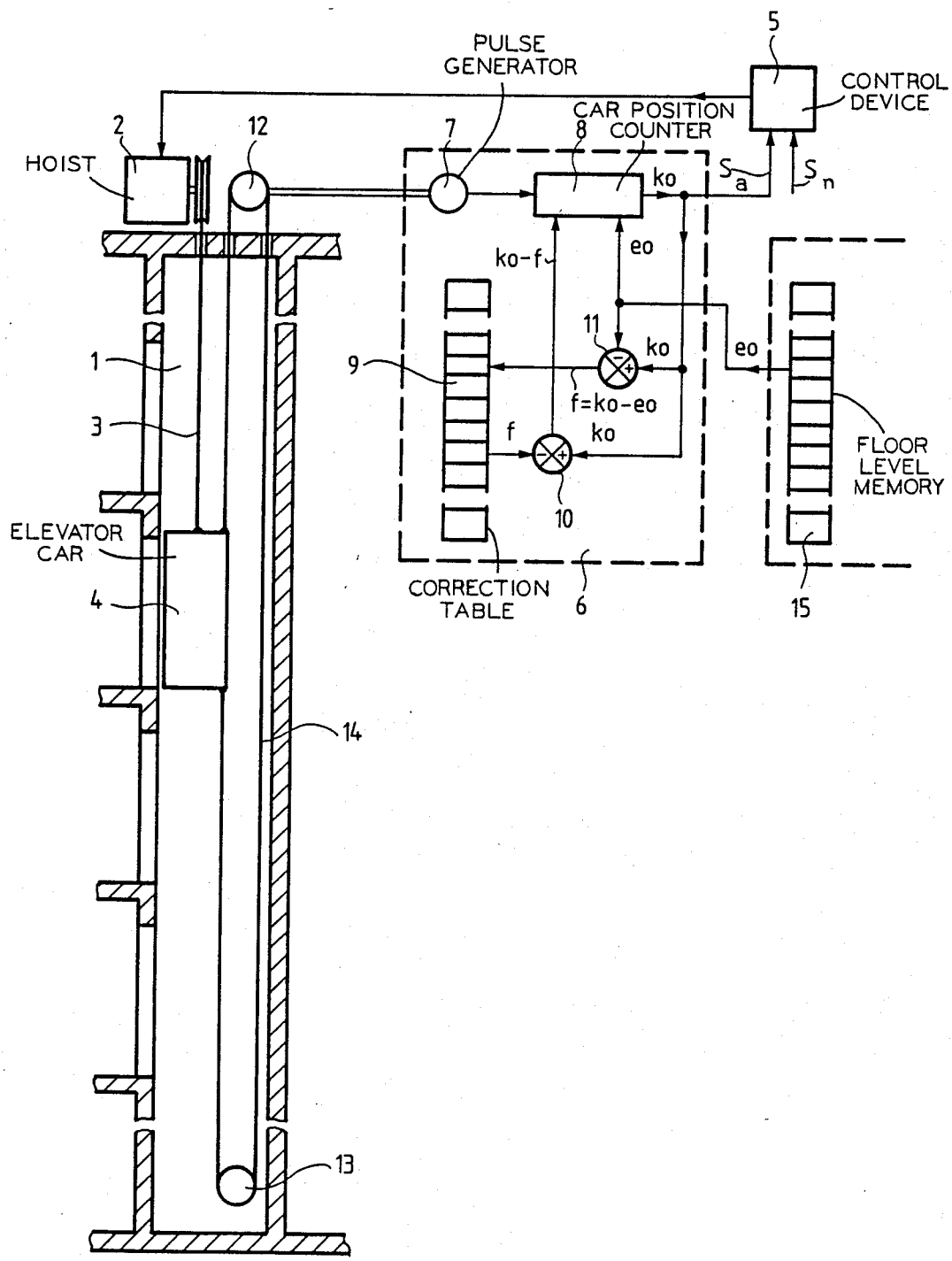
FIG. 1 is a schematic presentation of an elevator system with an actual position value transmitter according to the present invention.

Designed with 1 in FIG. 1 is the shaft of an elevator, in which an elevator car 4 is guided, driven by a hoist 2 by way of a hoisting cable 3 and balanced by means of a counterweight (not shown). The hoist 2, a control device 5 and an actual position value transmitter 6 form a position feedback control circuit. Typically, the control device 5 is connected at one input with the actual position value transmitter 6 to receive an actual position signal "$S_a$", and is connected at another input to a set point or nominal value transmitter (not shown) to receive the set point or nominal position signal "$S_n$". The control device 5 utilizes the difference between the two position input signals to generate a control signal to the hoist motor 2 at an output.

The actual position value transmitter 6 consists of a pulse transmitter 7 in the form of a digital tachometer, a car distance counter 8, a correction table 9, a first subtractor 10 and a second subtractor 11. The pulse transmitter 7 is coupled with a drive pulley 12 at the upper end of the shaft 1, which can be driven by means of a cable 14 attached to the elevator car 4 which cable is guided over a guide roller 13 arranged at the lower end of the shaft. On its input side, the car distance counter 8 is connected with an output of the pulse transmitter 7, which for instance generates a pulse per 0.5 mm travelling distance of the elevator car 4. The pulses are summed in the car distance counter 8 into floor level numbers, which correspond to the car position referred to a predetermined base car position, and are fed from an output to an input of the position control device 5 as actual position values represented by the actual position signal $S_a$.

The car distance counter 8 is connected furthermore on the output side with an input each of the first and second subtractors or comparators 10 and 11. The other input of the first subtractor 10 and the output of the second subtractor 11 are connected with an output and an input respectively of the correction table 9. The output of the first subtractor 10 is connected to an input of the car distance counter 8. Designated with 15 is a floor level memory which is disclosed in the European Patent application 0 026 406, and which has an output connected with the other input of the second subtractor 11 and an input of the car distance counter 8. Stored in the floor level memory 15 are the floor level values corresponding to the distance or location numbers of the floors, which relate to the above mentioned predetermined base. In a preferred form of embodiment, the car distance counter 8, the correction table 9, as well as the first and second subtractors 10 and 11, are elements of a microcomputer system, where the functions of the subtractors 10 and 11 are carried out by the processor of the system and where the correction table 9 is write-read memory. The correction table 9 includes memory locations assigned to the individual floors, in which, as described subsequently in more detail, stopping errors caused by slip of the cable 14 are stored.

Prior to the first operation of the elevator, a difference signal "f=ko−eo", representing a stopping error or correction value, is formed in the second subtractor 11 during a downward instructional travel. The corresponding correction value is stored for each floor as determined from the counter reading "ko" and the respective stored floor level value "eo". The difference is in each case written into the memory location of the correction table 9 assigned to the immediately preceding floor as a correction value. Thereafter, the counter output is erased and the floor level "eo" is transferred as the new counter output into the car distance counter 8.

After storing the correction values for the elevator and during the downward travels under normal operation, at a stop at or at the passing of each floor, the correction value "f" assigned to the next floor is fetched from the memory location corresponding to the preceding floor in the correction table 9 and fed to the first subtractor 10. In the first subtractor 10, a difference signal "ko−f" is formed from the counter output "ko" and the correction value "f" and transferred as the new counter output into the car distance counter 8, so that at arrival at the next floor the counter output agrees precisely with the floor level "eo" of that floor. During the upward travels, a correction of the counter output is not required, because the floor levels "eo" are written into the floor level memory 15 during an upward instructional travel by means of the car distance counter 8, so that no stopping errors caused by slip can occur during the upward travels.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An improvement in an actual position signal generator for use in the position control circuit of an elevator drive, the control circuit having a hoist motor coupled to drive an elevator car, an actual position signal generator including a pulse generator which is coupled with a drive pulley driven by means of a cable attached to the elevator car and guided over a guide roller and a car position counter having an input connected with an output of the pulse generator for generating an actual position signal, and a control device with one input connected to an output of the car position counter, another input connected to a source of a set point signal and an output connected to control the hoist motor, the improvement comprising:
  a correction table means connected to the car position counter for storing correction values representing stopping errors assigned to the floors and caused by slip of the cable; and
  means responsive to travel of the elevator car for generating the one of said correction values assigned to the next floor to the car position counter for correction of the counter actual position signal in response to the departure of the elevator car from the previous floor after a stop and the passing of the previous floor by the elevator car.

2. The improvement in the actual position signal generator according to claim 1 including a first subtractor having an input connected with the output of the car position counter and another input connected with an output of the correction table means and an output connected with the input of the car position counter whereby during the downward travel of the elevator car, a difference signal is formed in said first subtractor of the counter actual position signal and one of said correction values and said difference signal is transferred into the car position counter for correction of the actual position signal.

3. The improvement in the actual position signal generator according to claim 2 including a floor level memory means in which floor level values assigned to the floors are stored, a second subtractor having an input connected to an output of said floor level memory means and another input connected with the output of the car position counter and an output connected with an input of the correction table means, whereby said correction values are determined during a downward instructional travel of the elevator car on passing a floor by the formation of another difference signal between the counter actual position signal and the floor level value of the respective floor and said another difference signals are transferred into the correction table means to be stored.

4. An actual position signal generator for the position control circuit of an elevator drive, the control circuit including a hoist motor coupled to drive an elevator car and a drive control responsive to an actual position signal and a set point signal for controlling the hoist motor, the signal generator comprising:
  a pulse generator responsive to the position of an associated elevator car for generating a signal representing the distance travelled by the car;
  a car position counter connected to receive said pulse generator signal for generating an actual position output signal;
  a correction table means for storing correction values representing stopping errors for associated floors; and
  a first subtractor for generating a first difference signal and having a first input connected to said car position counter to receive said actual position output signal and a second input connected to said correction table means to receive said correction values, said first difference signal representing the difference between said actual position output signal and a one of said correction values for a next floor, whereby said first difference signal is applied to said car position counter to correct said actual position output signal upon the departure from and the passing of each floor by the elevator car.

5. The actual position signal generator according to claim 4 including a floor level memory for storing floor level values representing said actual position output signal at each floor during an upward instructional travel of the elevator car, and a second subtractor for generating a second difference signal and having one input connected to said car position counter for receiving said actual position output signal and another input connected to said floor level memory for receiving said floor level values, said second difference signal representing the difference between said actual position output signal and said floor level signal for a corresponding one of the floors, whereby said second difference signal is stored in said correction table means as said correction values during an initial downward instructional travel of the elevator car.

6. An improvement in an actual position signal generator for use in an elevator drive having a hoist coupled to drive an elevator car, a drive pulley driven by a cable attached to the elevator car, a pulse generator driven by the drive pulley, a car position counter connected to an output of the pulse generator, and a drive control connected to an output of the car position counter for controlling the hoist, the improvement comprising:

- a correction table means for storing a correction value for each of a plurality of floors;
- a floor level memory for storing a floor level value for each of the floors;
- a first subtractor having one input connected to a car position counter for receiving an actual position output signal, another input connected to an output of said correction table means for receiving said correction values, and an output connected to an input of the car position counter for generating a first difference signal representing the difference between the actual position output signal and one of said correction values for a corresponding one of each of the floors; and
- a second subtractor having one input connected to the car position counter for receiving the actual position output signal, another input connected to an output of said floor level memory for receiving said floor level values, and an output connected to an input of said correction table means for generating a second difference signal representing the difference between the actual position output signal and one of said floor level values for a corresponding one of each of the floors, whereby during an initial downward travel of the elevator car, said second difference signal is stored in said correction table means and, during a subsequent downward travel of the elevator car, said first difference signal is generated to correct the actual position output signal for a next floor upon departure from and passing each floor.

* * * * *